(12) United States Patent
Krämer

(10) Patent No.: US 6,932,210 B2
(45) Date of Patent: Aug. 23, 2005

(54) SELF-CLEANING OSCILLATING CONVEYOR FOR DEBURRING, DEDUSTING AND THE ONWARD TRANSPORT OF SMALL PARTS

(75) Inventor: Paul Krämer, Birchwil (CH)

(73) Assignee: Krämer AG Basserdoft, Basserdoft (CH)

( * ) Notice: Subject to any disclaimer, the term of this patent is extended or adjusted under 35 U.S.C. 154(b) by 0 days.

(21) Appl. No.: 10/398,554
(22) PCT Filed: Sep. 12, 2001
(86) PCT No.: PCT/CH01/00549
  § 371 (c)(1),
  (2), (4) Date: May 7, 2003
(87) PCT Pub. No.: WO02/28751
  PCT Pub. Date: Apr. 11, 2002

(65) Prior Publication Data
  US 2004/0020748 A1 Feb. 5, 2004

(30) Foreign Application Priority Data
  Oct. 4, 2000 (CH) .............................................. 1954/00

(51) Int. Cl.[7] .............................................. B65G 45/22
(52) U.S. Cl. ........................ 198/495; 198/493; 198/657
(58) Field of Search ................................ 198/495, 493, 198/657, 670, 671, 676

(56) References Cited

U.S. PATENT DOCUMENTS

| | | | | |
|---|---|---|---|---|
| 3,601,900 A | * | 8/1971 | Erisman et al. ................ 34/479 |
| 3,737,032 A | * | 6/1973 | Burkitt ......................... 209/10 |
| 3,754,559 A | * | 8/1973 | Seiwert ......................... 134/65 |
| 4,022,638 A | * | 5/1977 | Weet ............................. 75/715 |
| 4,180,155 A | * | 12/1979 | Stevick ......................... 198/498 |
| 4,465,721 A | * | 8/1984 | McAlister ...................... 528/86 |
| 5,111,929 A | * | 5/1992 | Pierick et al. ................. 198/495 |
| 5,473,967 A | * | 12/1995 | Frey et al. ..................... 83/402 |
| 5,514,399 A | * | 5/1996 | Cordera et al. ............. 426/295 |
| 5,564,555 A | * | 10/1996 | Doi et al. ..................... 198/495 |
| 5,657,852 A | * | 8/1997 | Bavington ................... 198/494 |
| 5,669,288 A | * | 9/1997 | Zittel et al. ................... 99/348 |
| 5,707,448 A | * | 1/1998 | Cordera et al. ............... 118/13 |
| 6,382,221 B2 | * | 5/2002 | Saitoh ........................ 134/25.5 |
| 6,638,062 B1 | * | 10/2003 | Davidson .................... 432/225 |
| 6,740,298 B1 | * | 5/2004 | Raginskii et al. ........... 422/274 |

OTHER PUBLICATIONS wo 92/16289, Treadwell, Oct. 1, 1992.*

* cited by examiner

*Primary Examiner*—Douglas Hess
(74) *Attorney, Agent, or Firm*—Edwin D. Schindler

(57) ABSTRACT

A self-cleaning oscillating conveyor includes a vertical tube and a conveyor channel that is helically wound upwardly around the vertical tube with a corresponding electromagnetic oscillating unit and a casing tube, which surrounds the exterior of the conveyor channel. The chamber between the vertical tube and the casing tube can be sprayed by several nozzles, which penetrate the interior of the vertical tube, or the exterior of the casing tube, with a liquid detergent, sprayed under pressure and using a delivery pump. The cleaning liquid runs onto the collection plate and over the rim thereof into a collection channel having a drain. In a preferred embodiment, semi-tubes, or half-tubes, are longitudinally mounted onto the casing tube in a sealed manner and a row of nozzles penetrates the casing tube from the chamber between the interior of the semi-tubes and the casing tube towards the interior.

13 Claims, 3 Drawing Sheets

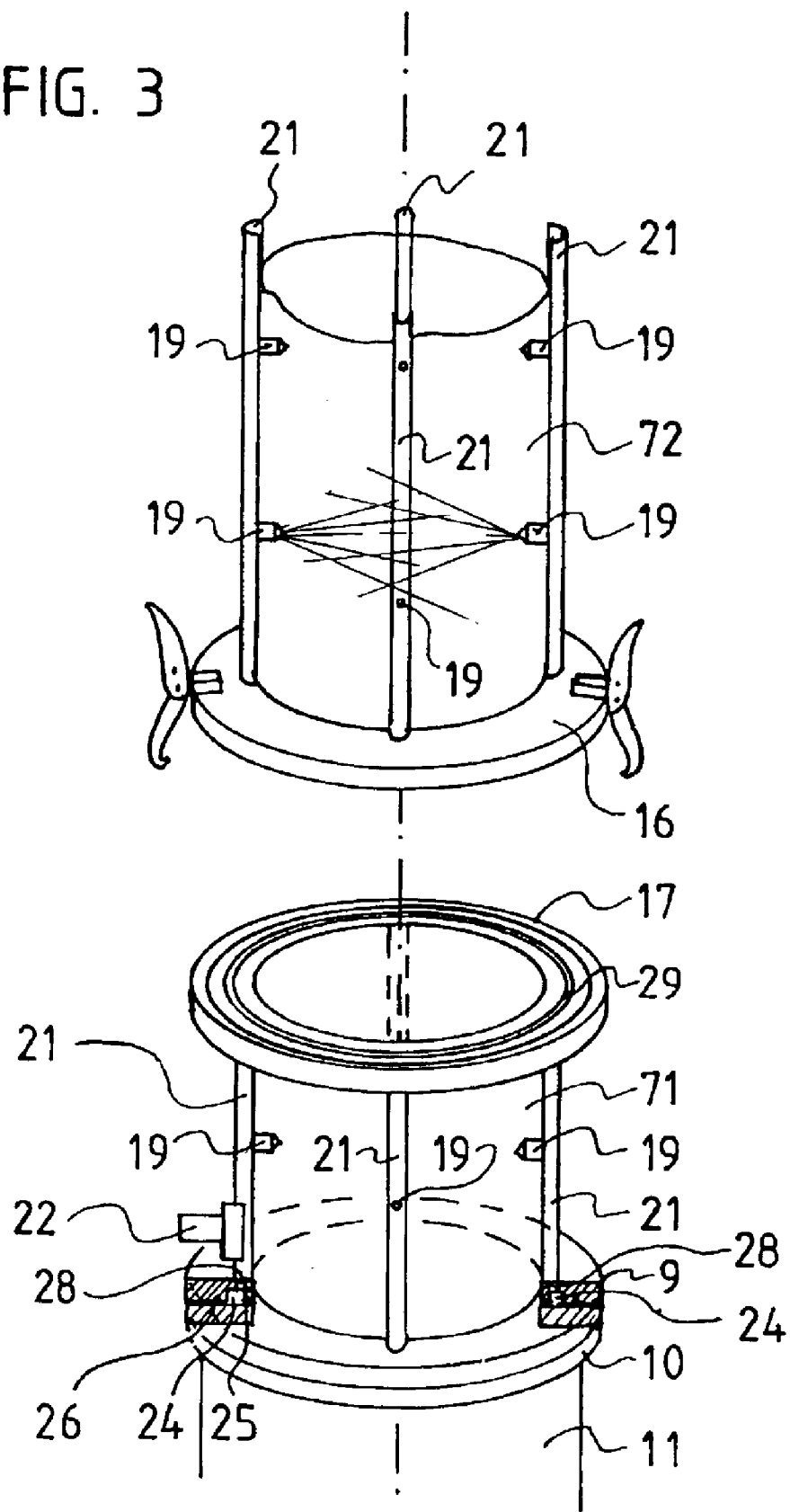

Figure 1:
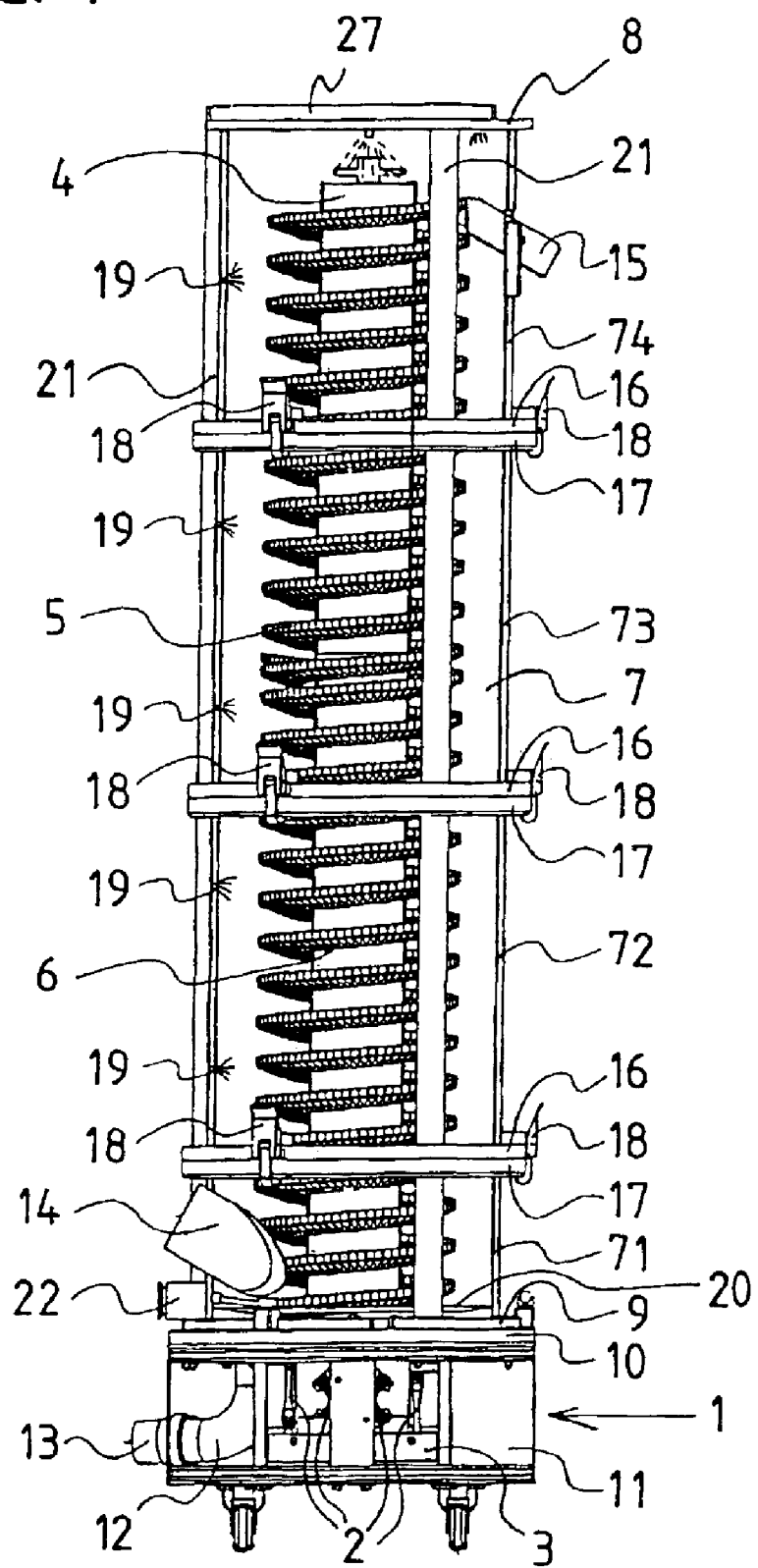

SELF-CLEANING OSCILLATING CONVEYOR FOR DEBURRING, DEDUSTING AND THE ONWARD TRANSPORT OF SMALL PARTS

BACKGROUND OF THE INVENTION

The present invention relates to a self-cleaning oscillation conveyor for deburring, dedusting and upwardly conveying small parts, in particular pills and tablets. Oscillation conveyors without self-cleaning means are known and in the production process of tablets are arranged directly after the tablet presses in order to upwardly convey the tablets and at the same time to deburr and dedust these so that they may subsequently be led to a packaging machine. Such oscillation conveyors have a helical path of a stainless steel channel which winds upwards around the outer wall of a standing tube and by way of an electromagnetic oscillation unit together with this tube may be set into a vibration with a horizontal and vertical component. A casing tube of steel or plastic is pushed over the outer side of the helical conveyor channel. The casing tube according to length often has a recess over roughly a third of the circumference of the casing tube, into which a plexiglass window is applied so that the conveying of the small parts may be observed. The tablets hop upwards on the helical path as a result of the vibration of the channel. By way of a suction device one may suction away the dust from the region over the helical path between the central tube and the casing tube through the central tube, which for this is provided with slots or is perforated.

The disadvantage of such an oscillation conveyor is that although the dust which arises on burring is largely suctioned away, certain contamination however remains on the walls of the central tube and of the casing tube as well as on the conveyor channel of the oscillation conveyor. If small parts are to be successively conveyed with the apparatus, thus tablets of various types with various active ingredients, then the inner walls of the oscillation conveyor must be thoroughly cleaned before each resetting to a new tablet type. Until now this cleaning has been effected by hand. Firstly the casing tube must be removed in order to create access to the conveyor channel and to the central tube. All dust-contaminated parts may then be rubbed off with a damp cloth, specifically the perforated conveyor channel, the outer side of the central tube as well as the base and lid of the conveyor space. Finally the inner side of the disassembled casing tube is cleaned. All parts are then dried and are subsequently put together. This cleaning work is time-consuming and laborious. Furthermore the apparatus is out of action during the cleaning and one loses time in the further processing of the manufactured small parts or tablets. Other installation parts in the production and packaging process remain still until the cleaning has been completed.

SUMMARY OF THE INVENTION

For these reasons it is the object of the present invention to provide a self-cleaning oscillation conveyor so that one does not require a disassembly of the apparatus, and a careful, thorough cleaning which is gentle on the apparatus is effected automatically without manual work.

This object is achieved by a self-cleaning oscillation conveyor for deburring, dedusting and upwardly conveying small parts, in particular pills and tablets, with a vertical tube and a conveyor channel which is wound around this in a helical manner, with an associated electromagnetic oscillation unit, as well as a casing tube encompassing the conveyor channel from the outside, which is characterised in that the space between the vertical tube and the casing tube may be sprayed by several nozzles passing through the vertical tube from the inside or the casing tube from the outside with a liquid washing agent under pressure by way of an associated conveyor pump, and the space on the lower side comprises a collection plate and a collection channel with a discharge, and that the inside of the oscillation conveyor for drying may either be flown through with warm air by connection of an air-blower, or after closure of all supply and discharges may be set under a part vacuum by connection to a suction pump.

BRIEF DESCRIPTION OF THE DRAWING FIGURES

One advantageous embodiment of such a self-cleaning oscillation conveyor is shown in the figures, by way of which it is explained in detail in the subsequent description.

There are shown in

Figure 2:
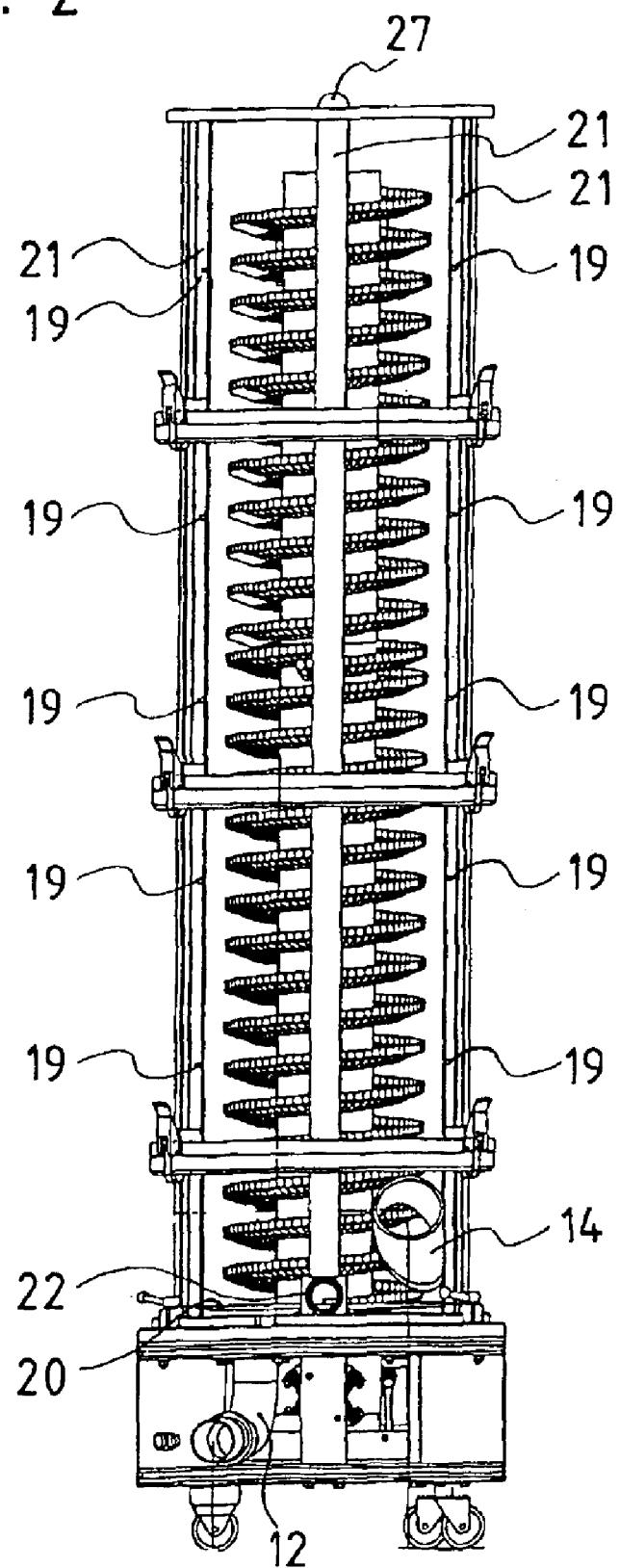

FIG. 1: the oscillation conveyor with a self-cleaning means, seen from the front;

FIG. 2: the oscillation conveyor with self-cleaning means, seen from the side;

FIG. 3: a cutout of two tube sections of a casing tube to be connected to one another.

DETAILED DESCRIPTION OF THE DRAWING FIGURES AND PREFERRED EMBODIMENTS

In FIG. 1 there is represented the self-cleaning oscillation conveyor seen from the front. Below one may see the oscillation unit 1 which consists of several leaf spring assemblies 2 which run obliquely to the vertical axis of the oscillation conveyor and connect a base plate, which is not to be seen here, to a counter-oscillation plate 3. The oscillation unit furthermore comprises an electromagnet installed below on the base plate between the leaf spring assemblies 3. This serves for exciting the oscillation between the base plate and the parts of the oscillation conveyor constructed thereon on the one hand and the counter-oscillation plate 3 on the other hand. A central tube 4 is constructed on the base plate and a conveyor channel 5 is built around this tube in a helical manner. The tube 4 and the conveyor channel 5 together with the base plate are set into oscillation or vibration, whilst all remaining parts of the oscillation conveyor remain quiet in operation. As a result of the induced oscillation the small parts are conveyed upwards on the helical path 5 which winds upwards with its inner edge 6 along the outer side of the central tube 4 acting as a carrier tube. The path 5 advantageously consists of perforated chrome steel and forms a trough in which in the middle in cross section has an angular bend. By way of this measure it is ensured that the tablets are mostly conveyed in a lying position. Even if individual tablets jump into an upright position for a time, then because of this trough shape they return to the lying position within a short time. Furthermore by way of this angular bend it is ensured that the tablets cannot jam on this path. A casing tube 7 is pushed over the carrier tube 4 and the path 5 winding upwards on the outer side of this carrier tube, wherein here the casing tube consists of plexiglass and thus permits the viewing of the path 5. A lid 8 sealingly closes the upper end of the casing tube 7. The casing tube 7 at the bottom is equipped with a flange 9 and this is sealingly applied onto an opening ring 10. The opening ring 10 for its part lies sealingly on the upper end of the housing 11. A filling duct 14 is led through the casing tube 7 above the start of the path 5, and above where the path 5 ends the casing tube 7 is passed through by an emptying duct 15. The casing tube 7 here consists of four tube sections 71–74 which are put together by way of flanges 16, 17 on the end side and are tensioned together by way of tension buckles 18 which are arranged distributed around the flange circumference.

For achieving the self-cleaning, the space between the vertical tube 4 and the casing tube 7 may be sprayed with several nozzles 19 which either pass through the vertical tube from the inside or the casing tube 7 from the outside. For this one uses a suitable fluid washing agent which is injected via these nozzles 19 under pressure by way of an associated conveyer pump. Afterwards the fluid runs downwards onto a collection plate 20 which is arranged below the conveyor channel 5, drips outwards over the edge of this into an annular collection channel, and from here to the outside through a discharge, which is not shown, into the collection channel. In the preferred embodiment which is shown here the nozzles 19 are radially arranged on the inside of the casing tube and one sprays from the outside to the inside. For this three semi-tubes 21 of plexiglass are sealingly applied onto the outer side of the casing tube 7 along the plexiglass casing tube 7 and distributed over its circumference. Advantageously these plexiglass semi-tubes 21 are adhesed onto the outer side of the casing tube 7. A whole series of nozzles 19 along each semi-tube 21 is screwed into this from the inner side of the casing tube 7 so that the nozzles 19 communicate with the inner space of the respective semi-tube 21 and thus cleaning fluid may be injected out of the inside of this semi-tube 21 through these nozzles 19 into the space within the casing tube 7. At least one of the semi-tubes 21 is equipped with a supply terminal 22 to which a pressure tubing may be connected for supplying the cleaning fluid. The used cleaning fluid then flows away via a discharge which is not shown here.

FIG. 2 shows this self-cleaning oscillation conveyor from the left side seen in FIG. 1. One sees three semi-tubes 21 with nozzles 19, which are distributed around the circumference of the casing tube, as well as the supply terminal 22 for connection of the pressure tubing. One may also see the filling duct 14 and the suctioning tube 12. So that the leading of the cleaning fluid from the pressure tubing is better understood, this leading of the fluid is explained further by way of FIG. 3.

FIG. 3 here shows two sections 71, 72 of a plexiglass casing tube 7 which are to be pushed over one another, said casing tube in the shown example being provided with four adhesed semi-tubes 21 which are distributed over the circumference. The lowermost section 71 of the casing tube 7 at the bottom comprises a flange 9. This lower flange 9 is placed onto an opening ring 10 which is rigidly built on the upper edge of the housing 11 in which the oscillation unit is accommodated. A circular groove 24 is taken out of the flange 9 from the lower side, as can be seen on both sides where the flanges 9, 10 are drawn in cross section. The circular groove 24 is sealed to the outside and inside by way of two O-rings 25, 26 which run on both sides of the circular groove 24. Axially running bores 28 which extend in the extension of the semi-tube inner spaces pass through the flange and thus create a connection between the circular groove 24 and the inside of this semi-tube 21. A supply terminal 22 is built onto a semi-tube 21. If then cleaning fluid is pumped through this terminal 22 into this one semi-tube 21, then the cleaning fluid flows out of this through the bore 28 in the flange 9 into the circular groove 24 and by way of a further bore 28 through the flange 9 also reaches the other semi-tubes 21. The pressure in the whole system spreads equally on all sides so that finally an equal pressure impinges all nozzles 19 of all semi-tubes 21. The next casing tube section 72 to be placed above onto the casing tube section 71 comprises a flange 16 which fits on the flange 17 in whose upper side again a circular groove 29 is taken out, from which bores through the flange 17 open into the semi-tubes 21 just as on the flange 9. The circular groove 29 is sealed to the inside and outside in each case by way of an O-ring. The flange 16 of the section 72 is placed onto the flange 72 and is sealingly tensioned with this by way of several tension buckles 18. Nozzles 19 are screwed into the casing tube wall from the inside of the casing tube 71, 72, here with M6 threads. The nozzles thus communicate with the inside of the sealingly attached semi-tube 21. One advantageously applies rotation nozzles which have a rotatable nozzle head which comprises at least one opening oblique to the general nozzle axis. The nozzle heads are set into rotation under the pressure of the pumped through fluid so that the liquid jet forms the envelope of a cone, as is indicated in the drawing. With this it is ensured that all parts between the casing tube 7 and the central tube 4 of the oscillation conveyor are sprayed under pressure, thus the complete casing tube inner side, the complete outer side of the central tube as well as also all sides of the conveyor channel 5. As FIG. 1 shows, a semi-tube 21 may also be connected to a semi-tube 27 which is adhesed at the top on a sealing lid in the same manner. Then from below one may also screw nozzles into the lid 8 which are then supplied from the inside of the semi-tube 27 which is arranged above the lid 8.

If thus a certain type of tablet has been conveyed, which left dust residue in the oscillation conveyor, and a new type is to be conveyed, then the inside of the oscillation conveyor is first thoroughly washed in that cleaning fluid is sprayed in the described manner at a pressure of approx. 2 bar and a temperature of about 70° C. When required also higher pressures and temperatures may be considered, depending on the used cleaning agent which is selected according to the type of conveyed small parts. The fluid thanks to the impingement under pressure then on all sides achieves an excellent cleaning of all surfaces in the inside of the oscillation conveyor. The dirty water runs downwards, flows downwards over the edge of the collection plate 20 into a collection channel arranged below the collection plate edge in an annular manner and to the outside via a discharge.

In an alternative embodiment the nozzles may however be placed between the windings of the conveyor channel 5 on the central perforated casing tube 4. The nozzles are then arranged for example in a row which likewise winds upwards within the central tube in a helical manner, but staggered between the windings of the conveyor channel. These nozzles are then supplied by a tubing which from above or below is led into the inside of the central tube and for each nozzle comprises a branching in the form of a T-piece so that again it is ensured that as a result of the pressure which spreads equally on all sides each nozzle is uniformly impinged with pressure. The cleaning fluid is then generally sprayed radially into the space between the central tube and the casing tube, wherein in the case of rotation nozzles the circumferential jet covers the envelope of a cone. It is however also possible to realise the supply of the cleaning fluid by way of several straight tube pieces which run along the inner wall of the central tube so that the nozzles are screwed through the wall of the central tube from the outside into these supply tubes directly or via small tube sections. A central largely dimensioned steel tube along the axis of the central tube 4 is also conceivable as a supply tube. In this case all nozzles are screwed directly into this central supply tube via nipples.

After the washing procedure it is necessary to dry the oscillation conveyor rapidly and thoroughly. It is indeed only then ready for operation. For drying, in a first variant, warm air is blown through the oscillation conveyor instead of cleaning fluid. With this warm air may assume the same path as previously the cleaning fluid, which is to say that the used air blower is connected to the terminal 22.

In another variant the filling duct 14 and emptying duct 15 in each case are sealingly closed with a cap, and the discharge and dust suction pipe 12 in each case are sealed with a closure cap. Afterwards by way of a suction pump or an industrial vacuum cleaner one creates a part vacuum in the inside of the oscillation conveyor which is required for evaporating the remains of the fluid. For further aiding the drying process one may also arrange heating means in the inside of the oscillation conveyor, for example in the form of an electrical heating wire which likewise is wound around the central tube between the conveyor channel windings, or arrange electrical heating means in the inside of the central tube which heat the whole central tube for supporting the drying in the part vacuum.

What is claimed is:

1. A self-cleaning oscillation conveyor for deburring, dedusting and upwardly conveying small articles, comprising:
   a vertical tube;
   a conveyor channel helically wound around said vertical tube;
   a casing tube encompassing said vertical tube and said conveyor channel with a space existing between said vertical tube and said casing tube;
   means for spraying a plurality of jets of a liquid washing agent under pressure upon all inner margin surfaces of the space existing between said vertical tube and said casing tube, and upon an upper side and a lower side of said conveyor channel for permitting an automatic washing of an interior of said self-cleaning oscillation conveyor, said means for spraying including a conveyor pump having a plurality of spray nozzles passing through said vertical tube from an inner side or passing through said casing tube from an outer side and being distributed over a circumference and height of said vertical tube and said casing tube;
   a collection plate and a collection channel having a discharge for collecting the liquid washing agent; and,
   means for drying said interior of said self-cleaning oscillation conveyor.

2. The self-cleaning oscillation conveyor for deburring, dedusting and upwardly conveying small articles according to claim 1, wherein said means for drying comprises an air blower for blowing warm air inside said self-cleaning oscillation conveyor for drying the small articles.

3. The self-cleaning oscillation conveyor for deburring, dedusting and upwardly conveying small articles according to claim 1, wherein said means for drying comprises a suction pump for creating a partial vacuum within said self-cleaning oscillation conveyor following closure of all supply openings and discharge openings.

4. The self-cleaning oscillation conveyor for deburring, dedusting and upwardly conveying small articles according to claim 1, further comprising semi-tubes sealingly located along said outer side of said casing tube, said plurality of spray nozzles passing through said casing tube toward an inner side of said casing tube for washing inside of said semi-tubes with a liquid washing agent applied under pressure.

5. The self-cleaning oscillation conveyor for deburring, dedusting and upwardly conveying small articles according to claim 4, wherein upper ends of said semi-tubes are sealingly closed by a lid placed onto said casing tube.

6. The self-cleaning oscillation conveyor for deburring, dedusting and upwardly conveying small articles according to claim 4, wherein said casing tube and said semi-tubes are made of Plexiglass with said semi-tubes being adhesively sealed onto said casing tube.

7. The self-cleaning oscillation conveyor for deburring, dedusting and upwardly conveying small articles according to claim 1, further comprising:
   a flange located at a lower end of said casing tube, said flange having a circular groove on a side distant to said casing tube;
   semi-tubes placed along said outer side of said casing tube, said semi-tubes being sealingly connected via their longitudinal edges to said outer side of said casing tube, with each semi-tube of said semi-tubes having inside thereof an axial bore in said flange communicating with said circular groove, and with radial bores in said casing tube communicating with the inside of each said semi-tube, said plurality of spray nozzles placed into the radial bores from an inner side of said casing tube.

8. The self-cleaning oscillation conveyor for deburring, dedusting and upwardly conveying small articles according to claim 7, wherein at least one said semi-tube includes a connection terminal for pumping the liquid washing agent.

9. The self-cleaning oscillation conveyor for deburring, dedusting and upwardly conveying small articles according to claim 7, wherein said casing tube is comprised of a plurality of sections with adjacent sections being connected with at least one flange.

10. The self-cleaning oscillation conveyor for deburring, dedusting and upwardly conveying small articles according to claim 7, wherein upper ends of said semi-tubes are sealingly closed by a lid placed onto said casing tube.

11. The self-cleaning oscillation conveyor for deburring, dedusting and upwardly conveying small articles according to claim 7, wherein said casing tube and said semi-tubes are made of Plexiglass with said semi-tubes being adhesively sealed onto said casing tube.

12. The self-cleaning oscillation conveyor for deburring, dedusting and upwardly conveying small articles according to claim 1, wherein said vertical tube sealingly stands on said collection plate, said collection plate having a smaller diameter than an inner diameter of said casing tube, with an annular channel below said collection plate running between an edge of said collection plate and a wall of said casing tube, said annular channel projecting beyond said collection plate and comprising a discharge for fluid flowing downwardly within said casing tube for capturing said fluid by said annular channel and for disposing of said fluid via said discharge.

13. The self-cleaning oscillation conveyor for deburring, dedusting and upwardly conveying small articles according to claim 1, wherein said plurality of nozzles are rotation nozzles having at least one opening exiting obliquely to a nozzle axis, said rotation nozzles being capable of being set into rotation via a force created by the liquid washing agent so that the liquid washing agent is sprayed into an inner space of said self-cleaning oscillation conveyor formed as an envelope of a cone, thereby effecting an impingement of all portions of the inner space of said self-cleaning oscillation conveyor.

* * * * *